G. LAKHOVSKY.
NUT OR LOCKING DEVICE FOR SCREWS.
APPLICATION FILED OCT. 12, 1910.
1,054,570.
Patented Feb. 25, 1913.
2 SHEETS—SHEET 1.
Fig. 1.
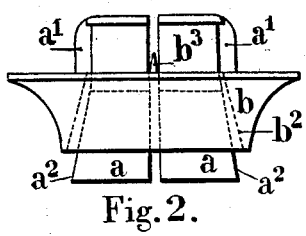
Fig. 3.
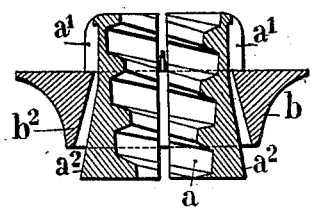
Fig. 2.
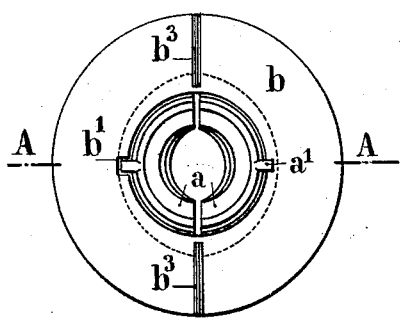
Fig. 4. Fig. 5. Fig. 7.
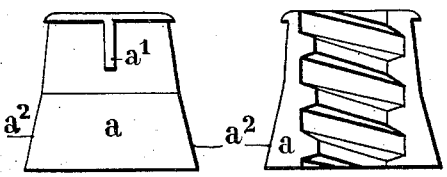 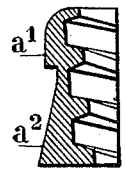
Fig. 6.
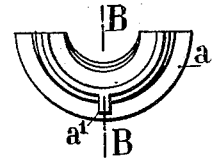
Fig. 8.
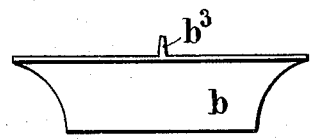
Fig. 10.
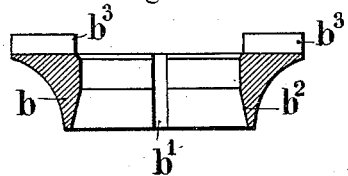
Fig. 9.
INVENTOR
Georges Lakhovsky
BY
ATTORNEYS
WITNESSES
COLUMBIA PLANOGRAPH CO., WASHINGTON, D. C.

G. LAKHOVSKY.
NUT OR LOCKING DEVICE FOR SCREWS.
APPLICATION FILED OCT. 12, 1910.
1,054,570.
Patented Feb. 25, 1913.
2 SHEETS—SHEET 2.
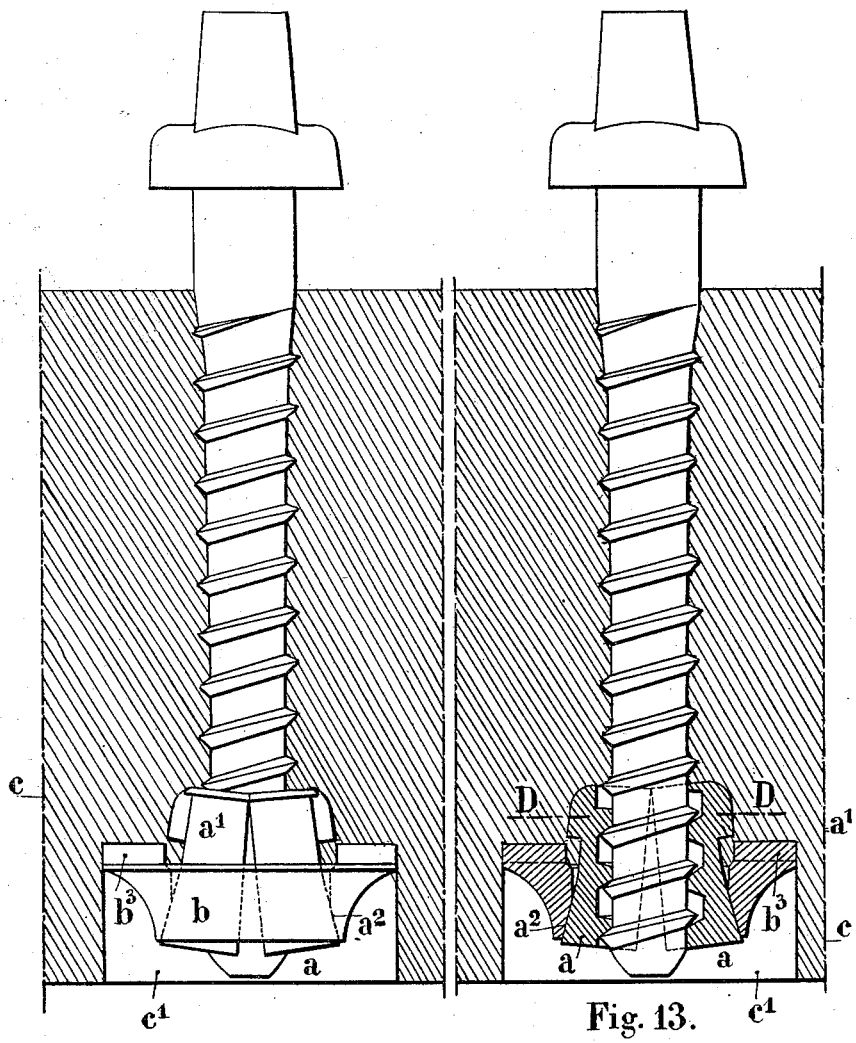
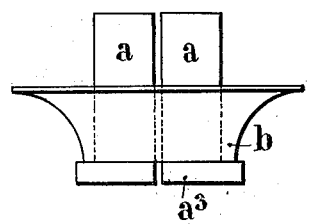
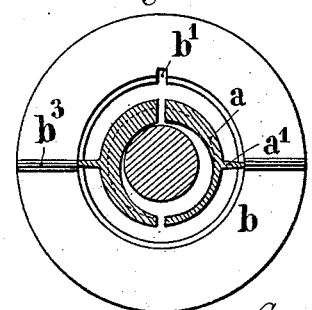
WITNESSES
INVENTOR
Georges Lakhovsky
BY
ATTORNEYS

UNITED STATES PATENT OFFICE.

GEORGES LAKHOVSKY, OF PARIS, FRANCE.

NUT OR LOCKING DEVICE FOR SCREWS.

1,054,570. Specification of Letters Patent. Patented Feb. 25, 1913.

Application filed October 12, 1910. Serial No. 586,639.

*To all whom it may concern:*

Be it known that I, GEORGES LAKHOVSKY, of 5 Avenue du Bois de Boulogne, in the city of Paris, Republic of France, engineer, have invented an Improved Nut or Locking Device for Screws, of which the following is a full, clear, and exact description.

The present invention has for its object to provide a nut or locking device for securing screws and particularly for the screw spikes in railway sleepers.

The device which is both easy and cheap to manufacture offers great resistance to the tearing out of the screw spikes even when the sleepers are made of soft wood.

A nut or locking device made in accordance with this invention is provided with two shells threaded interiorly to correspond with the thread on the screw spike and with an abutment ring engaging the two shells.

The annexed drawing shows by way of example one form of device constructed in accordance with the present invention.

Figure 1 is an elevation of the nut. Fig. 2 is a plan thereof. Fig. 3 is a vertical section on line A—A, Fig. 2. Fig. 4 is an elevation of the exterior surface of a shell. Fig. 5 is an elevation of the interior surface thereof. Fig. 6 is a plan thereof and Fig. 7 a vertical section on line B—B of Fig. 6. Fig. 8 is an elevation of the abutment ring. Fig. 9 a plan thereof and Fig. 10 a vertical section on line C—C of Fig. 9. Figs. 11 to 13 show the nut in use on a screw spike; Figs. 11 and 12 being respectively an elevation and a section, and Fig. 13 being a horizontal section on line D—D of Fig. 12. Fig. 14 is an elevation of a modified form of the device.

The locking device comprises two shells $a$ and a ring $b$ engaging the shells, and each shell is threaded interiorly to correspond with the thread on the screw spike employed for securing the rails to the railway sleepers. The internal surface of each shell presents throughout its height a radius of curvature equal to that of the body of the screw spike and its generatrix is preferably inclined to the axis of the shell. Exteriorly each shell is provided at its upper extremity with a tenon $a^1$ and at its lower extremity with a conical surface $a^2$. The abutment ring $b$ is provided interiorly with a slot $b^1$ for the passage of the tenons $a^1$ on the shells, as will be hereinafter described, and it is also provided at its lower extremity with an internal conical surface $b^2$. This ring $b$ may furthermore be provided on its upper surface with two tenons $b^3$ which will penetrate into the wood of the sleeper when the latter is being screwed and will so prevent the nut from rotating.

In order to assemble the device one of the shells $a$ is first introduced into the ring $b$, the second shell is then introduced, its tenon $a^1$ being passed through the slot $b^1$ in the ring, the two shells are then rotated to a small angular amount in such a manner that they are retained on the ring $b$ by their tenons $a^1$.

In use, a recess $c^1$ is countersunk in the under part of the sleeper $c$ concentric with the hole adapted to receive the screw spike and of a diameter slightly less than that of the two shells, the nut is then forced friction tight into this countersunk recess and the sleeper is replaced in position. When the rail has been placed in position the screw spike is screwed into the sleeper; during the downward motion of the screw spike its lower extremity engages the nut and screws itself into the two shells. Owing to the inclination of the internal surfaces of the latter this screwing action tends to draw up the two shells and so brings them into contact with the conical surface $b^2$ on the ring $b$. Furthermore, this screwing and the consequent drawing of the two shells into the conical part of the ring $b$ forces the two shells against the ring and so brings about a firm wedging of the shells within the ring.

During the tightening of the nut the tenons $b^3$ on the ring are caused to penetrate into the wood of the sleeper and so prevent the nut from being rotated by the rotation of the screw spike. By means of this arrangement the ring $d$ becomes integral with the screw spike and distributes over all the surface $c^2$ of the sleeper the tractive effort exerted by the spike. This locking device thus permits a very secure fixing of the screw spike even in very soft woods and offers great resistance to withdrawing strains.

This nut or locking device has the further advantage of being both easy and cheap to manufacture for all its constituent elements may be obtained by molding or stamping.

Fig. 14 shows a modified form of the invention wherein the shells $a$ are maintained within the ring $b$, not by a jamming action as hereinbefore set forth, but by means of a flange $a^3$ provided on the lower part of each shell.

The shape and dimensions of this locking device, as well as the number of shells may be varied without altering the principle of the invention.

Claims:

1. A device for securing screw spikes, particularly in railway sleepers, comprising interiorly threaded shells, an abutment ring surrounding said shells, said shells extending above this ring so that they can be forcibly engaged in the hole of the sleeper before screwing in the screw spike.

2. A device for securing screw spikes, particularly in railway sleepers, comprising interiorly threaded shells, a ring surrounding said shells and having at its upper part an abutment disk adapted to lie against the lower part of the sleeper, said shells extending above the ring so that they can be forcibly engaged in the hole of the sleeper before screwing in the screw spike.

3. A device for securing screw spikes, particularly in railway sleepers, comprising interiorly threaded shells having at their upper part an outer rib, a ring surrounding these shells and having at its upper part an abutment disk adapted to lie against the lower part of the sleeper and an inner notch, said shells extending above said ring.

4. A device for securing screw spikes, particularly in railway sleepers, comprising interiorly threaded shells having at their upper part an outer rib, a ring surrounding said shells and having at its upper part an abutment disk provided with ribs and with an inner notch, said shells extending above this ring.

5. A device for securing screw spikes, particularly in railway sleepers, comprising internally threaded shells having at their upper part an outer rib and presenting at their lower part an outer conical surface, a ring surrounding said shells and having an inner conical surface, said ring presenting at its upper part an abutment disk provided with ribs and with an inner notch, said shells extending above this ring.

6. A device for securing screw spikes, particularly in railway sleepers, comprising interiorly threaded shells having a screw thread of progressively increasing height, provided at their upper part with an outer rib and presenting at their lower part an outer conical surface, a ring surrounding said shells, and having an inner conical surface, the said ring presenting at its upper part an abutment disk provided with ribs and with an inner notch, said shells extending above this ring.

7. A device for securing screws, comprising two interiorly threaded shells each having a conical lower portion and provided with an exterior rib, and an abutment ring having an interior conical surface, interior vertical slots and ribs on its upper face.

The foregoing specification of my improved nut or locking device for screws, signed by me this 28th day of September 1910.

GEORGES LAKHOVSKY.

Witnesses:
H. C. COXE,
R. EHIREOT.

---

Copies of this patent may be obtained for five cents each, by addressing the "Commissioner of Patents, Washington, D. C."